United States Patent Office 3,511,332
Patented May 12, 1970

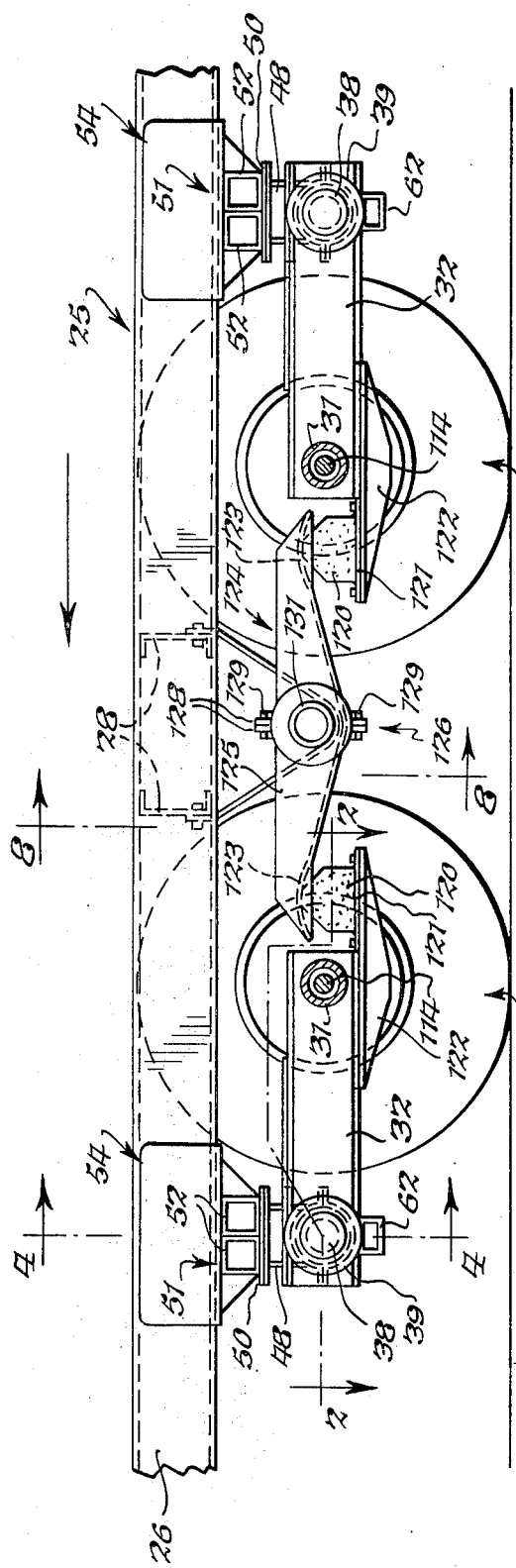

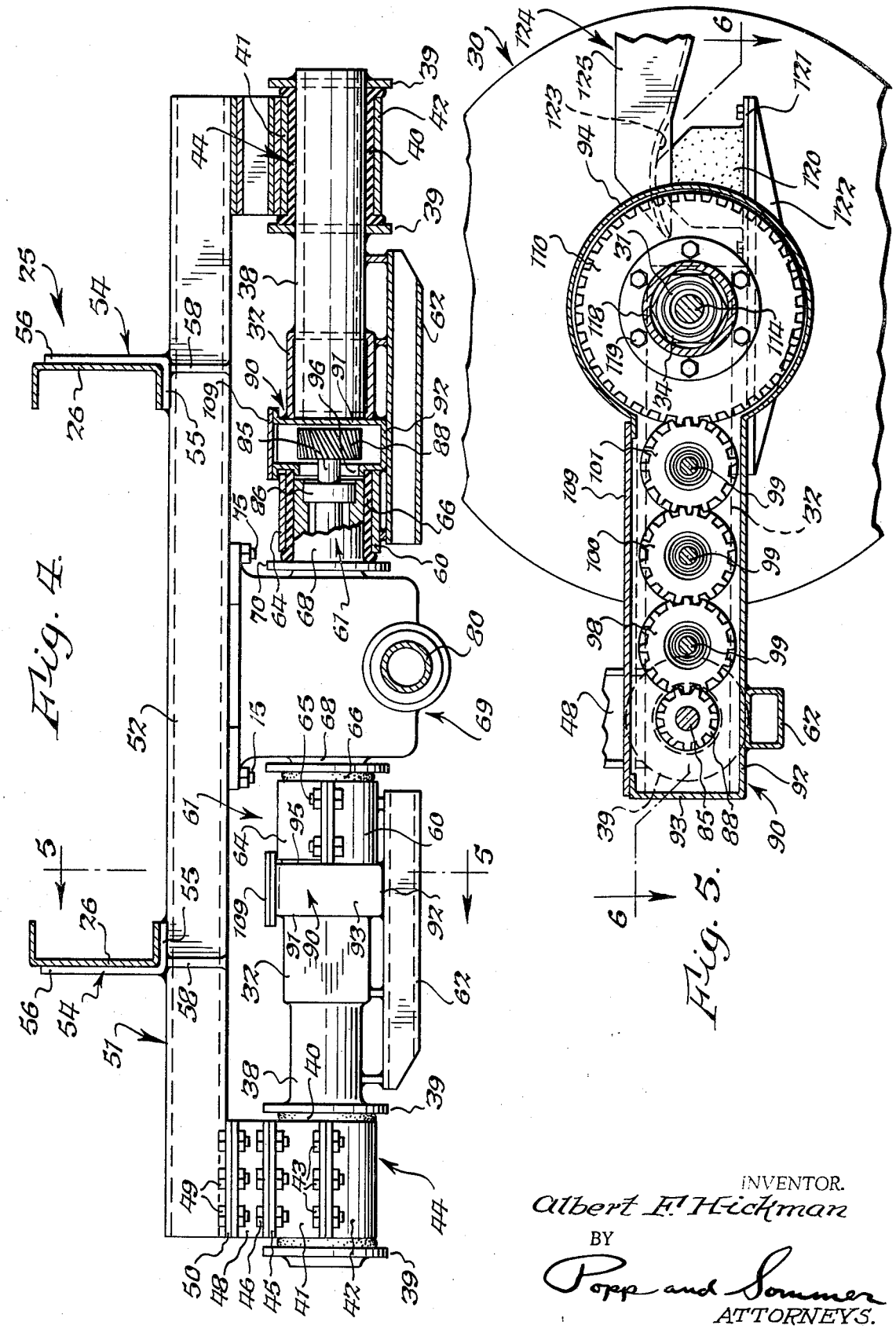

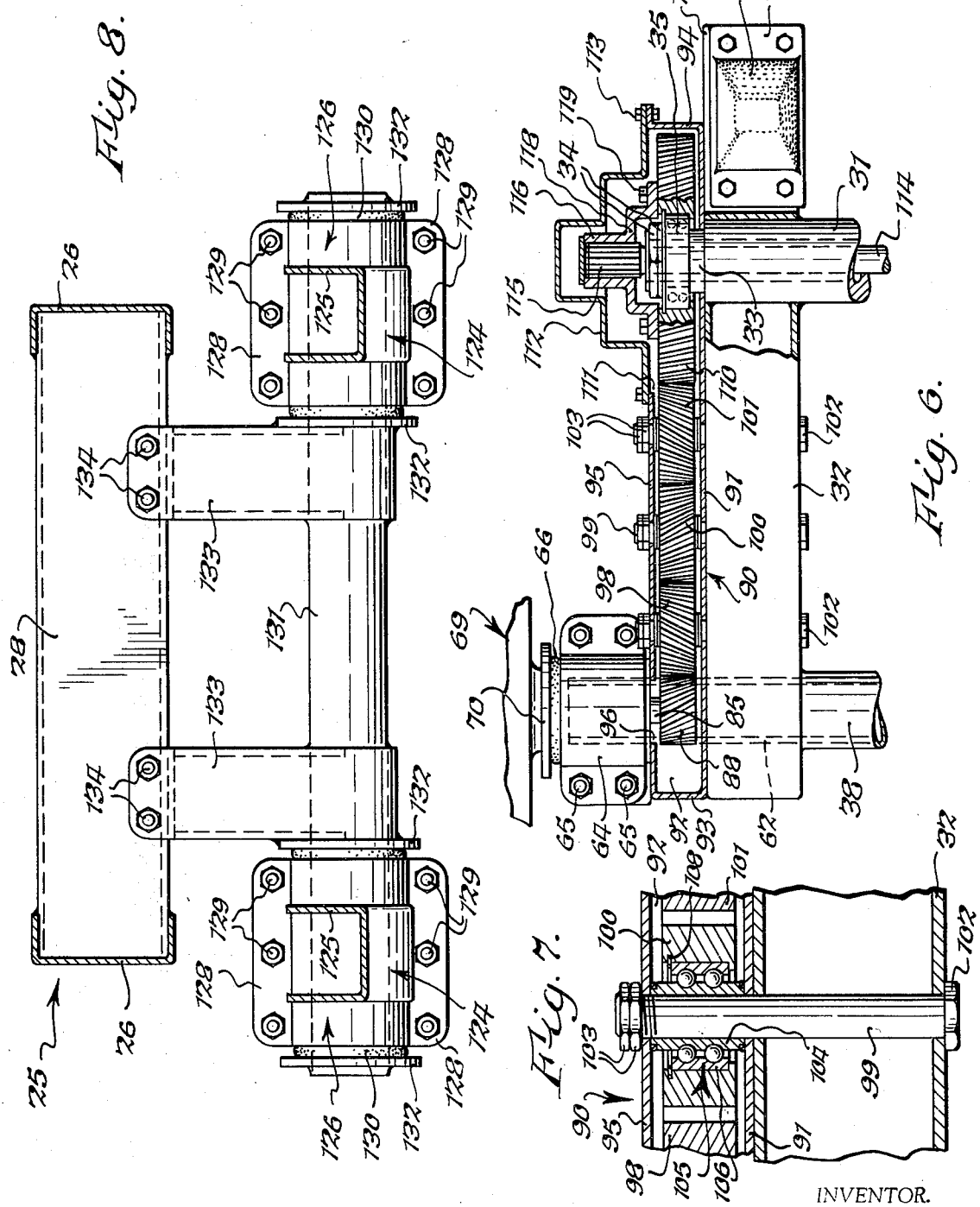

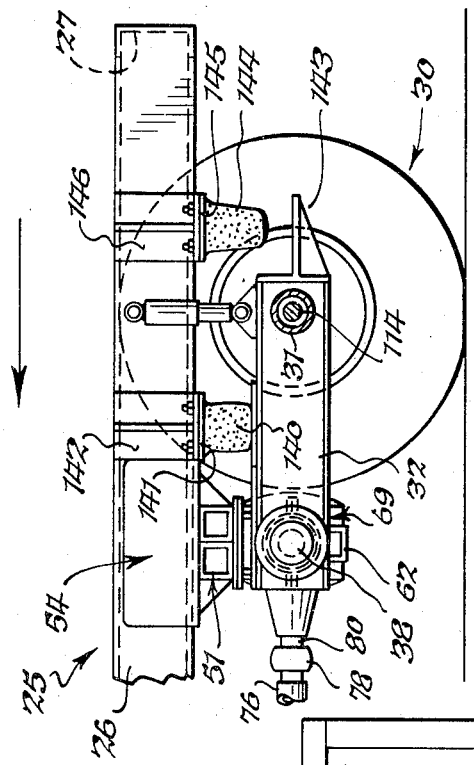
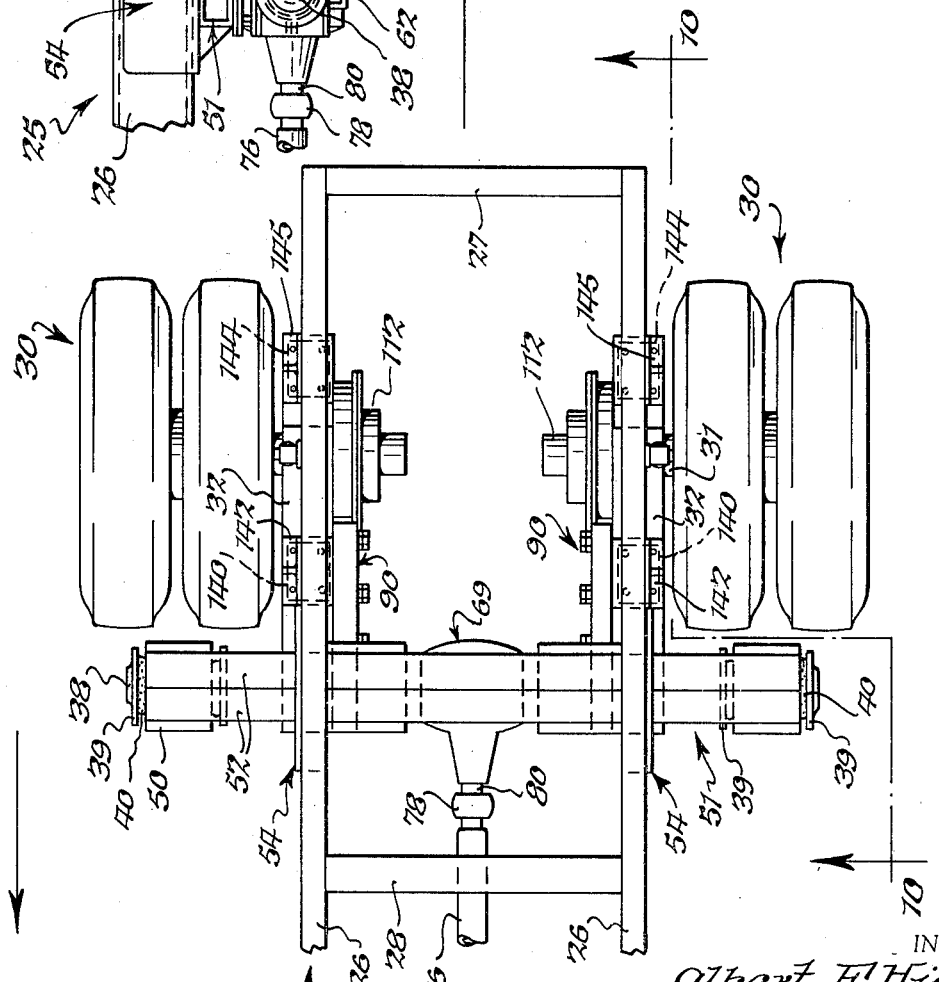

3,511,332
COMPRESSION RUBBER SPRING SUSPENSION FOR TRAILING ARMS SUPPORTING DRIVEN WHEELS
Albert F. Hickman, Eden, N.Y. 14057
Continuation-in-part of application Ser. No. 591,899, Nov. 3, 1966. This application Apr. 28, 1967, Ser. No. 634,561
Int. Cl. B60k *17/00*
U.S. Cl. 180—73
8 Claims

ABSTRACT OF THE DISCLOSURE

While not limited to any particular service, the suspension is shown as being a so-called independent wheel suspension between a vehicle frame and its rubber tired ground engaging drive wheels which can be single wheels on opposite sides of the frame or tandem wheels. Each wheel rotatably supports a stub axle at the free end of an arm, which arm is journalled at its other end on the frame on a horizontal axis extending transversely of the line of travel. A rubber block is compressed between the frame and a seat on a longitudinal extension of the free end of the arm, and in one form of the invention this rubber body is compressed directly against a frame bracket. In the tandem axle suspension form, the free ends of the arms of the tandem wheels at each side of the vehicle project horizontally toward each other and the rubber body at the outboard end of each arm is compressed against the corresponding end of a walking beam journalled on the frame. Another aspect of the invention resides in the transmission of driving power to the wheels, this being from a differential gear fixed to the vehicle frame and including differential output shafts extending coaxially through the hubs of the wheel arms at opposite sides of the vehicle frame. Each shaft drives a train of gears journalled on and extending along each arm, the last of these gears being drivingly connected to its rubber tired drive wheel.

---

Figure 3:
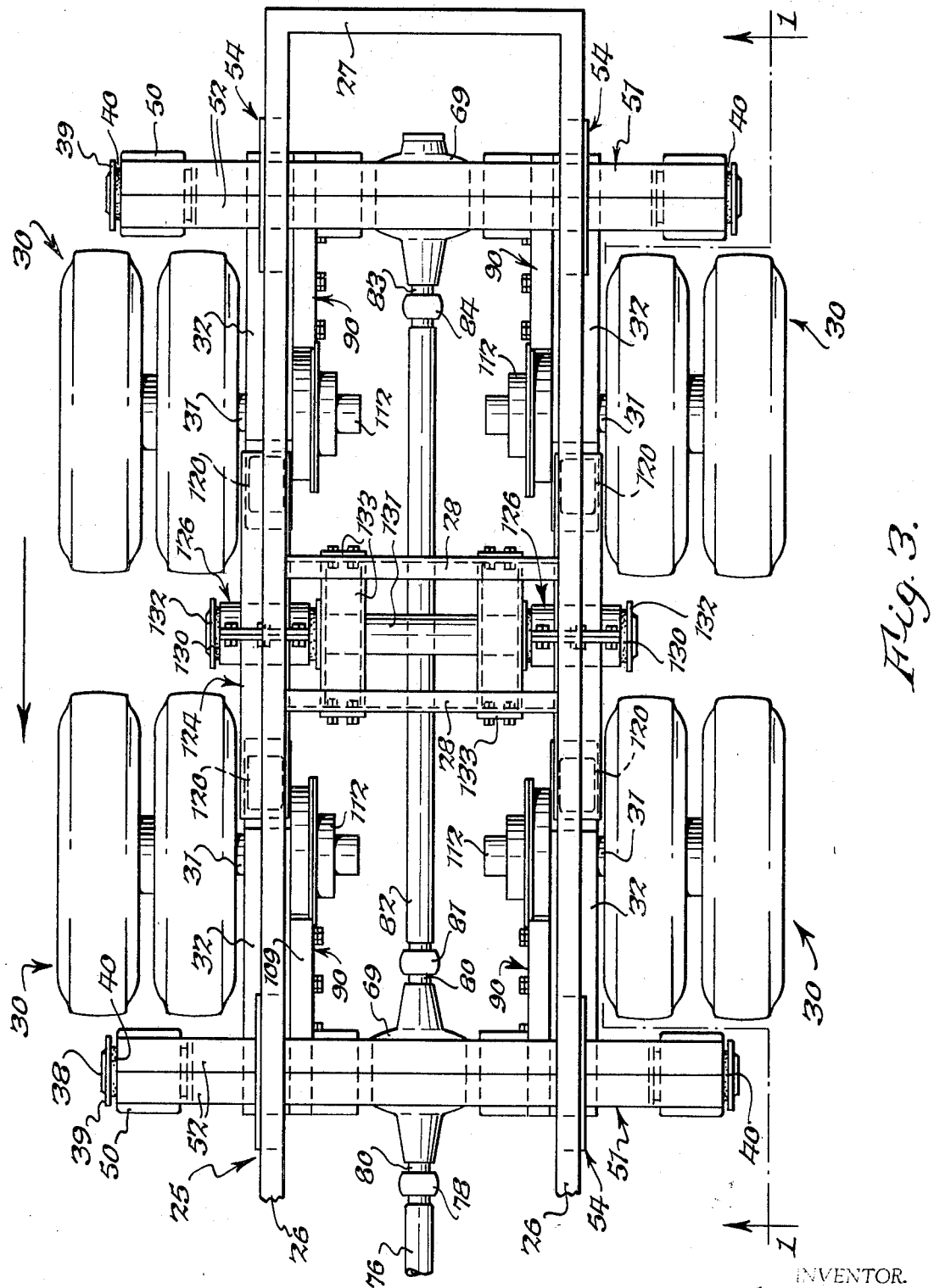

This application is a continuation-in-part of my copending application Ser. No. 591,899 filed Nov. 3, 1966 for Spring Suspension, now Pat. No. 3,410,573, dated Nov. 12, 1968.

The present invention relates to an improved spring suspension, and more particuarlly, to a spring suspension between the driving wheels and body of a vehicle.

In common with my Pat. No. 3,410,573 general objects of the present invention are to provide such a suspension which is friction-free but produces resistance to motion in direct proportion to the amplitude and velocity of vertical main frame movement; which consists of compact components which are arranged so as not to interfere with frame and wheel movement and in which the vertically moving parts are arranged inside and close to the wheels and provide high and wide support for the vehicle frame on stub axles with resulting increased stability; which can have softer springs than those now on the market for equivalent duty and at the same time have greater side sway control through high and wide spring mounting; which can have many years and hundreds of thousands of miles of carefree operation; in which substantially all suspension bearings, other than the wheel bearings, can be in the form of rubber bodies distorted to provide the required movement and are free from friction and lubrication or other service requirements; which is light in weight, particularly in unsprung weight; which is low in both initial cost and upkeep; which renders auxiliary devices for the control of side sway unnecessary; and in which periodic vibration of the suspension is dampened out.

An important specific object is to provide such a suspension which is adapted for very heavy-duty trucks for highway and off the highway services and in which the suspension components do not interfere with the power, control or other components of the truck.

Another important specific object is to provide an improved suspension adapted for very heavy-duty trucks which includes a part of the power train to the wheels and in which the differential can be mounted on the main frame so as to greatly reduce the unsprung weight and in which the suspension can twist while the alignment of the gear drive components is maintained to provide a positive drive.

Another important specific object is to provide such a suspension which can be adapted to single rear wheels supporting opposite sides of the main frame, or can be adapted to two or more independent rear wheels in tandem at each side of the vehicle frame.

Another specific object is to provide such a suspension made of components which are interchangeable so as to greatly reduce manufacturing cost through mass production of a plurality of identical components and also to reduce inventory requirements in the field for wrecked vehicles.

Another specific object is to provide a suspension in which the resilient support is provided by the compressive action of rubber blocks which in a tandem wheel suspension can be arranged to act in series so as to contribute jointly to a softer and low frequency ride, and in a single wheel suspension can be arranged to provide a first stage spring for the empty vehicle and a second stage spring which adds its effect in supporting the frame when loaded.

Another specific object is to provide such a heavy-duty suspension which is extremely simple and low in cost considering the function it performs.

In the drawings FIG. 1 is a fragmentary side elevational view of the vehicle frame in the position of carrying a normal load and supported at each side by a tandem wheel suspension embodying the present invention, parts being omitted for the purpose of clarity, this view being taken on line 1—1, FIG. 3, and the wheels being the drive wheels for the vehicle. In this and other views the direction of movement of the vehicle is shown by a large overhead arrow. FIG. 2 is a top plan view of one hub-arm-stub axle unit connecting each wheel with the frame, this view being taken generally on line 2—2, FIG. 1. FIG. 3 is a fragmentary top plan view of the frame and the tandem wheel suspension shown in FIGS. 1 and 2. FIG. 4 is an enlarged vertical transverse section taken generally on line 4—4, FIG. 1. FIG. 5 is a fragmentary longitudinal section taken generally on line 5—5, FIG. 4. FIG. 6 is a fragmentary horizontal section taken generally on line 6—6, FIG. 5. FIG. 7 is an enlarged horizontal section through one of the gears, the section being taken generally on line 7—7, FIG. 5. FIG. 8 is an enlarged vertical transverse section taken generally on line 8—8, FIG. 1. FIG. 9 is a view similar to FIG. 3 and showing a modified form of the invention having single independent drive wheels. FIG. 10 is a fragmentary vertical longitudinal section taken generally on line 10—10, FIG. 9.

In both forms of the invention shown, the vehicle frame 25 can be of any suitable construction and is shown as comprising a pair of main longitudinal side frame bars 26 in the form of inwardly facing channels which are shown as straight and parallel and connected at their rear ends by a cross channel bar 27. The frame is also shown as including intermediate cross channel bars 28, as shown in FIGS. 1, 3, 8 and 9.

In both forms of the invention, the frame 25 is shown as supported by rubber tired wheels 30, these wheels being shown in the form of dual-tired wheels, that is, pairs of rim structures bolted together side-by-side and each pair of rim structures being journalled on a tubular stub axle 31 in any suitable manner (not shown), these stub axles extending horizontally transversely of the line of travel of the vehicle and the stub axles 31 at opposite sides of the vehicle being normally arranged in line with each other as best shown in FIG. 3.

Each tubular tub axle 31 is welded or fixed to the end of an arm 32 which can be of any suitable form but is shown as being of rectangular box form with the stub axle 31 extending through its side walls and being welded to its outboard end, as best shown in FIG. 6. As also shown in this figure, each tub axle 31 has an inner end 33 of reduced diameter in turn having a threaded end protruding toward the center of the frame which carries nuts 34 securing the inner race of a ball bearing 35 on this stub axle extension for a purpose which will presently appear. As best shown in FIG. 1, the arm 32 supported by each forward wheel 30 projects toward the front of the frame 25 from its stub axle 31 so that its inboard end is arranged to the front of the group of wheels 30 whereas the arm 32 supported by each rearward wheel 30 projects rearwardly from its stub axle 31 so that its inboard end is arranged to the rear of the group of wheels 30.

This inboard end of each arm 32 embraces and is welded to an outer tubular hub member 38, this outer hub member extending through the side walls of its box-form arm 32 generally parallel with the axis of its stub axle 31. The inner end of each outer tubular hub member 38 terminates at the inner vertical longitudinal wall of its box-form arm 32 as best shown in FIG. 4, but its outer end projects beyond the side of the vehicle frame so as to be in line with at least a part of the tread of its outer dual wheel 30, as best shown in FIG. 2. This outer end has a pair of spaced rings 39 welded to and projecting radially from its periphery, each pair of these rings serving to prevent the axial displacement of a rubber bushing 40 which compressively embraces each tubular hub member 38 between these rings. Each rubber bushing 40 is embraced by upper and lower half bearing housings 41 and 42 which are drawn together to compress the rubber bushing by bolts 43 extending through the usual side flanges of these half bearing housings. Each rubber bushing 40 and its half bearing housings 41 and 42 form a bearing 44 for the hub 38 of its arm 32. The upper half bearing housing 41 has a welded horizontal top plate 45 connected by bolts 46 to the bottom of a spacer 48 which is in turn connected by bolts 49 to the bottom plate 50 of a frame bolster indicated generally at 51.

Each frame bolster 51 is shown as comprising a pair of horizontal tubes 52 of square form in cross section arranged side-by-side below the side frame bars 26 and with their opposite ends projecting transversely of the line of movement of the vehicle beyond these side frame bars 26 and being connected together by the bottom plates 50. An L-shaped frame bracket 54 has a horizontal flange 55 welded to the top of each end of each pair of tubes 52 and a vertical flange 56 alongside and suitably secured to the outer face of the corresponding longitudinal side frame bar 26 as best shown in FIG. 4. Also as shown in this figure and FIG. 1, triangular reinforcing ribs 58 can be provided between the sides of the tubes 52 and the bottom flange 55 of each flame bracket 54.

Each outer tubular hub member 38 is connected to the bottom half 60 of a concentric split bearing housing 61 by a tubular bar 62 welded to both, as well as to the companion arm 32, each bar 62 preferably being of rectangular tubular form in cross section, and suitably welded risers or spacers being provided on top of each bar 62 to compensate for the different distances between the top of the bar and the parts which it connects, as best shown in FIG. 4. Each split bearing housing 61 has an upper half bearing housing 64 connected to the bottom half bearing housing 60 by bolts 64 and the half bearing housings 60, 64 compressively embrace a rubber bearing bushing 66 on a tubular neck or boss 68 projecting horizontally outwardly from the corresponding side of a housing for a differential 69. An axially outwardly projecting ring 70 on this neck or boss limits axial displacement of the rubber bushing 66.

Two housings for differentials 69 are provided as best shown in FIG. 3, one for each pair of wheels 30 on opposite sides of the vehicle. Each of these housings for the differentials is secured, as by stud bolts 75, to the underside of the center of each bolster 51, so that these differential housings are fixed to the vehicle frame 25. The forward differential 69 is driven from the engine (not shown) of the vehicle by a drive shaft 76 through a conventional flexible coupling 78 connecting with the through shaft 80 of this differential, the opposite end of the through shaft 80 being connected through a flexible coupling 81 with a drive shaft 82 for the rear differential 69, the connection to the drive shaft 83 of this rear differential being through a flexible coupling 84. Since the housings for both differentials 69 are bolted via the bolsters 51 to the vehicle frame 25, the only function of the flexible joints 78, 81, 84 is to accommodate frame twisting or other displacement so that these flexible couplings can be of simple and inexpensive construction. Furthermore it will be noted that the heavy differential housings, together with their contained differential bearing, are a part of the fully sprung load since they are mounted on the vehicle frame 25.

The differential gearing within each housing can be of conventional form and is not shown, this gearing driving a pair of differential output shafts 85 projecting outwardly from the necks or bosses 68 of each differential housing and journalled in bearings 86 therein. Fixed to the outer end of each differential output shaft 85 is a pinion 88 arranged in one end of a bear box indicated generally at 90.

As best shown in FIGS. 6 and 7 one vertical wall 91 of each gear box 90 is fixed to the inner vertical wall of a companion one of the box-form arms 32 and the box is completed by a bottom wall 92, end walls 93 and 94 and a vertical wall 95 which faces the center of the vehicle frame. The bottom wall 92 of the gear box 90 can also be welded to its box-form tube 32, as best shown in FIG. 4, and each vertical wall 95 is provided with an opening 96 through which the corresponding output differential shaft 85 extends. The pinion 88 fast to each differential shaft 85 meshes with a gear 98 journalled on a cross bolt 99 this gear meshing with a gear 100 journalled on a similar cross bolt 99 and this gear 100 in turn meshing with a gear 101 journalled on a similar cross bolt 99, as best shown in FIGS. 5 and 6. As shown in FIG. 7 each of these cross bolts 99 extends completely through the vertical side walls of both the box-form arm 32 and the gear box 90, the head 102 of each bolt 99 bearing against the outer face of the outer vertical side wall of its arm 32 and the nuts 103 of each bolt 99 bearing against the exterior face of the vertical side wall 95 of its gear box 90, these nuts drawing this wall against a cylindrical spacer around the bolt 99 which forms the inner race 104 for a ball bearing 105 the outer race 106 of which is fitted and held within the bore of its gears 98, 100 or 101 in any conventional manner, such by means of the snap ring 108 as shown in FIG. 7. Upon removing of any of the bolts 99 any of these gears 98, 100, 101 can be removed through the open top of its gear box 90, the gear box being provided with a removable cover plate 109 for this purpose, as best shown in FIGS. 4 and 5.

The end wall 94 of each gear box 90 is in the form of a large cylinder to house a large concentric gear 110 which meshes with and is driven by the gear 101. The wall 95 of gear box 90 is provided with a large circular opening 111 to permit of removal of this gear 110, this opening 111 being covered by a removable cover plate 112 secured to the inner wall 95 by bolts 113 or in any other suitable manner and which is of stepped form as best shown in FIG. 6 to accommodate the connection between its gear 110 and the drive shaft 114 for the corresponding wheel 30.

Each of these drive shafts 114 is fixed to its dual wheel 20 in any suitable manner (not shown) and is housed within the tubular stub axle 31 thereof as best shown in FIGS. 1 and 6. The portion of each drive shaft 114 within the stepped cover 112 is formed to provide an enlarged splined portion 115 which is fitted within the internally splined portion 116 of a hub cap 118 which is bolted to the large gear 110 by stud bolts 119 or in any other suitable manner. This gear 110 is carried by the outer race of the ball bearing 35 which, as previously described, is secured to the stub axle extension 33 as best shown in FIG. 6.

A tandem axle suspension is illustrated in FIGS. 1–8 and the resilience for the suspension is provided by a rubber body 120 associated with each stub axle 31. Each rubber body is shown as being of rectangular form in horizontal section with a pyramidal top and having its base vulcanized to a plate 121 removably secured to an axle bracket 122 which forms a longitudinal extension of the outboard end of a corresponding box-form arm 32. For this purpose, each axle bracket 122 is welded to the underside of the outboard end of its box-form arm 32 below its stub axle 31 as best shown in FIGS. 1 and 5, and forms a projection of its arm 32 toward the companion arm 32 at the same side of the vehicle. Each axle bracket 122 can be of any suitable form to provide the necessary strength for transmitting vertical forces to its rubber body 120, the top of which bears against a downwardly facing socket 123 at the end of a walking beam 124. As best shown in FIG. 1 the sockets 123 are provided at opposite ends of this walking beam 123 and are supported by the companion rubber bodies 120 for the two box-form arms 32 at each side of the vehicle frame 25.

Each walking beam 124 can be of any suitable construction but is shown as comprising a pair of channel-shaped arms 125 the inner end of each of which is welded to and projects horizontally from a corresponding half bearing housing 126. These half bearing housings 126, 126 are provided with outwardly projecting vertical flanges 128 which are bolted together by bolts 129 into compressive relation with a rubber bushing 130 which embraces the corresponding end of a cross rod 131 fixed to the frame 25 and projecting outwardly from opposite sides thereof as best shown in FIGS. 3 and 8. Each rubber body 130 can be held against endwise displacement by a pair of rings 132 welded to the cross rod 131 and this cross rod is provided with a pair of V-shaped frame brackets 133 through which the cross shaft extends and is welded and the upper part of which is removably secured, as by bolts 134, to a pair of the cross frame channels 28 as best shown in FIGS. 1 and 8.

OPERATION

FIGS. 1–8

The direction of movement of the vehicle is shown by the large arrows above FIGS. 1–3 and in the operation of this form of the invention the upward movement of one, say, the front wheel 30 and its stub axle 31 effects corresponding upward movement the outboard end of its box-like arm 32 and counterclockwise movement of its fixed hub member or tubular cross shaft 38, as viewed in FIG. 1, such movement being permitted by the rubber bushings 40 and 66 of the bearings 44 and 61.

This angular counterclockwise movement of the tubular hub 38 of the assumed front wheel 30 at the side of the vehicle effects an upward movement of the outboard end of the axle bracket 122, this moving upwardly the rubber body 120 and compressing it against the underside pocket 123 of the front arm 125 of its walking beam 124. The hub of this walking beam is in the form of the two half-bearing housing sections 126 which are rotatably mounted through the companion rubber bushing 130 on the end of the frame cross rod 131 and hence the assumed upward movement of the forward end of the walking beam 124, cushioned by the forward rubber body 120, effects downward movement of the rear end of this walking beam, thereby to compress the rubber body 120 for the rear stub axle 31 downwardly against its bracket 122 at the outboard end of its box-form arm 32. This downward force of the rear end of the walking beam 124 against the rear stub axle 31 serves to equalize the load between the pair of wheels 30 at the side of the vehicle frame 25 under consideration. It will be noted that substantially all of the resilient resistance to such vertical movement of any of the wheels 30 is provided by the rubber bodies 120 acted upon in direct compression, but that the entire suspension is friction free, the journals being provided by the rubber bushings 40, 66 and 130 which are twisted for this purpose.

A particular feature of the invention resides in the mounting of the housings for the universal 69, together with the heavy differential gearing (not shown) contained therein, on the vehicle frame 25 so that this heavy weight is part of the fully sprung mass, rather than being a part of unsprung full axles as is now common practice. These two differentials 69 are driven through the drive shafts 76 and 82, simple flexible couplings 78, 81 and 84 being provided merely to permit a limited amount of frame distortion without interfering with the differential drive. Each differential 69 transmits power from its drive shaft to its two diametrically opposite output shafts 85 journalled in bearings 86 in its diametrically opposite coaxial differential housing sleeves or bosses 68 as best shown in FIG. 4. The pinion 88 at the end of each differential output shaft 85 transmits this movement through the train of gears 98, 100, 101 and 110 arranged in the gear housing 90 which in turn is secured to and hence forms part of the corresponding box-form arm 32. This latter gear 110, through its hub cap 118, drives the splined end 115 of the companion wheel drive shaft 114, as best shown in FIG. 6. Each wheel drive shaft 114 is connected by means (not shown) with the companion dual wheel 30 and hence all four of the dual wheels of the tandem axle, as shown particularly in FIG. 3, are driven to propel the vehicle frame 25 along the road.

It will be particularly noted that each dual wheel 30 is capable of independent vertical movement while at the same time driving power is transmitted thereto via the train of gears 88, 98, 100, 101 and 110 along the box-form arm 32 which connects each dual wheel 30 to the vehicle frame. It will also be noted that vertical forces against any wheel are transmitted through the walking beam 124 to the companion dual wheel 30 at the same side of the vehicle so that the load is at all times shared by these two dual wheels. It will also particularly be noted that this load transfer between the dual wheels 30 at each side of the vehicle is through the rubber bodies 120 which serve, in compression, to provide substantially the entire resilient resistance against movement of the several wheels vertically with reference to the frame 25.

It will also be noted that the hub member 38 of each box-form arm 32 is supported by the widely spaced rubber bushings 40 and 66 of the bearings 44 and 61 so that there is no effective corner loading of each of these bearings; the box-form arms 32 are essentially constrained to vertical movement; while at the same time these rubber bushings 40 and 66 by twisting provide friction free journals for the inboard ends of the box-form arms 32 and at the same time provide a limited degree of resilience against horizontal forces.

FIGS. 9 AND 10

In FIGS. 9 and 10 the invention is shown as embodied in a two dual wheel rear end suspension which is identical to the tandem wheel form of the invention shown in FIG. 1 except, of course, for the means resiliently supporting the vehicle frame on the box-form arms 32. Accordingly the description of these identical parts and their operation will not be repeated and the same reference numerals have been employed.

A two stage rubber body suspension is shown for each box-form wheel arm 32, the first stage being provided by a rubber body 140 having its bottom in contact with the top of its wheel arm 32 intermediate the ends of the latter. The top of this rubber body is vulcanized to the underside of a plate 141 removably attached to a frame bracket 142. An axle bracket 143 is attached to and projects longitudinally outwardly from the outboard end of each wheel arm 32 and has a top face engageable with the bottom of another or second stage rubber body 144. The top of this last rubber body is vulcanized to the underside of a plate 145 removably attached to a frame bracket 146.

It will be seen that the frame 25 is supported at each side by the first stage rubber body 140 which is compressed to a greater or lesser degree depending upon the load carried and the vertical forces against its dual wheel 30 in traveling over irregularities in the roadway or ground. With heavy loads or vertical forces from the roadway, the end bracket 143 contacts and compresses the rubber body 144 which thereby provides a second stage of resilient spring resistance.

From FIG. 2, it will be noted that the same hub-arm-stub axle structure can be used for all four drive wheels of the tandem axle of FIGS. 1–8 as well as both drive wheels of the two wheel suspension of FIGS. 9 and 10, this greatly reducing manufacturing cost as well as greatly reducing the required inventories of supplies of replacement parts. Further from FIG. 2, and FIGS. 8 and 9, it will be noted that the hub member is journaled on the frame in line with at least a part of the tread of the tire, the arm fixed to this hub member extends along the side of the wheel facing the center of the frame and the stub axle at the outboard end of this arm is also in line with the tire tread, so that while the rubber body or bodies in each instance are interposed between an upwardly facing seat on the arm and a downwardly facing seat on the frame to be compressed and expand and contract horizontally, the effective support of the rubber body or bodies is at the tread of the tire by virtue of the hub and stub axle being in line with this tread.

As in the preceding description, in the following claims "wheel" is intended to include the ground engaging means 30 supporting each stub axle regardless of whether in the form of a single wheel or in the form of the dual tired wheel shown and also the term "rubber" is intended to include natural or synthetic rubber or mixtures of both.

I claim:

1. A vehicle spring suspension adapted to be interposed between each side of a vehicle frame and a rubber tired supporting wheel having a road engaging tread, wherein the improvement comprises a hub structure for each suspension arranged on the corresponding side of said frame, and each having a central body portion and inboard and outboard end portions fixed to project from opposite sides of said body portion on a first axis arranged externally of the tread of the corresponding wheel and generally parallel with the axis of rotation thereof, an arm fixed at one end to said central body portion to project radially therefrom, a stub axle projecting outwardly from the other end of each arm along said axis of rotation and journalled on its wheel, a first inboard bearing means and a second outboard bearing means at each side of said frame coaxial with said first axis, each said bearing means having a central longitudinal plane extending normal to said first axis, means fixing said inboard and outboard bearing means to said frame in pivotal engagement respectively with said inboard and outboard end portions of the corresponding hub structure, the longitudinal center of each arm being spaced a first distance from said longitudinal plane of said first bearing means and a second distance from said longitudinal plane of said second bearing means, said first and second distances differing from each other thereby to proportion the load against each arm between its first and second bearing means in accordance with their said distances from the center of their arm, a part of both said outboard bearing means and said outboard end portion of each hub structure being arranged outwardly in an outboard direction beyond a plane coinciding with the axial center of the periphery of the corresponding wheel to provide widely spaced outboard supports for said frame on said rubber tired wheels, and means between said frame and said arm resiliently supporting said frame on said arm including a resilient rubber body compressed by said arm to expand and contract laterally of such compression to provide resilient support for said frame on said rubber tired wheels.

2. A vehicle spring suspension adapted to be interposed between each side of a vehicle frame and a rubber tired supporting wheel having a road engaging tread, wherein the improvement comprises a hub structure for each suspension arranged on the corresponding side of said frame and each having a central body portion and inboard and outboard end portions fixed to project from opposite sides of said body portion on a first axis arranged externally of the tread of the corresponding wheel and generally parallel with the axis of rotation thereof, a substantially straight arm fixed at one end to project substantially perpendicularly from said central body portion of each hub structure adjacent the inboard and remote from the outboard end portions thereof, a stub axle projecting perpendicularly outwardly from the other end of each arm along said axis of rotation and journalled on its wheel, an inboard first bearing means and an outboard second bearing means at each side of said frame coaxial with said first axis, means fixing said inboard and outboard bearing means to said frame in pivotal engagement respectively with said inboard and outboard end portions of the corresponding hub structure, the longitudinal center of each arm being spaced a first distance from said first bearing means and being spaced a second distance from said second bearing means with said first distance being less than said second distance thereby to proportion the load against each arm between its first and second bearing means in accordance with said distance from the center of their arm, and means between said frame and said arms resiliently supporting said frame on each arm including a resilient rubber body compressed by said arm to expand and contract laterally of such compression to provide resilient support for said frame on said rubber tired wheels.

3. A vehicle spring suspension adapted to be interposed between a vehicle frame and a rubber tired supporting wheel having a road engaging tread, wherein the improvement comprises said suspension having a hub structure including a central body portion and two end portions projecting axially from opposite sides of said body portion, one of said end portions being in the form of a first cylindrical neck fixed to said body portion and the other of said end portions being in the form of a first half bearing housing fixed to said body portion coaxial with said first neck, a first rubber bushing embracing said first neck, a pair of second and third half bearing housings compressively embracing said first rubber bushing, means fixing one of said second and third half bearing housings to said frame to form a first bearing means, a second neck fixed to said frame and projecting coaxially into said first half bearing housing, a second rubber bushing embracing said second neck, a fourth half bearing housing mating with said first half bearing housing to compressively embrace said second rubber bushing and form a second bearing means, an arm fixed at one end to said central body portion of said hub structure and projecting radially therefrom, means journalling the other end of said arm on said supporting wheel, the longitudinal center of said arm being spaced a first distance from said first bearing means and being spaced a second distance from said second bearing means, said first and second distances differing from each other thereby to proportion the load against said arm between its first and second bearing means in accordance with their distances from the center of their arm, and means between said frame and said arm resiliently supporting said frame on said arm including a resilient rubber body compressed by said arm to expand and contract laterally of such compression to provide resilient support for said frame on said rubber tired wheel.

4. A vehicle spring suspension as set forth in claim 3 wherein said means fixing said first half bearing housing to said central body portion comprises a bar arranged generally parallel with the axis of said hub structure, means securing one end of said bar to said first half bearing housing and means securing the other end of said bar to said central body portion of said hub structure.

5. A vehicle spring suspension adapted to be interposed between each side of a vehicle frame structure and a rubber tired supporting wheel having a road engaging tread, wherein the improvement comprises a hub structure for each suspension on the corresponding side of said frame structure and each having a central body portion and inboard and outboard end portions fixed to project from opposite sides of their body portion on a first axis arranged externally of the tread of the corresponding wheel and generally parallel with the axis of rotation, an arm fixed at one end to said central body portion to project radially therefrom, a stub axle projecting outwardly from the other end of each arm along said axis of rotation and journalled on its wheel, and inboard and an outboard bearing means at each side of said frame coaxial with said first axis, the central vertical longitudinally extending plane of said arm being closer to the central vertical longitudinally extending plane of one of said bearing means than to the central vertical longitudinally extending plane of the other of said bearing means, means fixing said inboard and outboard bearing means to said frame in pivotal engagement respectively with said inboard and outboard end portions of the corresponding hub structure, and means resiliently supporting said frame on said arms including a resilient rubber body operatively interposed between each arm and frame structure and fixed to one and being able to separate from contact with the other thereof, said rubber body being compressed to provide resilient support for said frame on said rubber tired wheels.

6. A vehicle spring suspension adapted to be interposed between each side of a vehicle frame structure and a rubber tired supporting wheel having a road engaging tread, wherein the improvement comprises a hub structure for each suspension on the corresponding side of said frame structure and each having a central body portion and inboard and outboard end portions fixed to project from opposite sides of their body portion on a first axis arranged externally of the tread of the corresponding wheel and generally parallel with the axis of rotation thereof, an arm fixed at one end to said central body portion to project radially therefrom, a stub axle projecting outwardly from the other end of each arm along said axis of rotation and journalled on its wheel, an inboard and an outboard bearing means at each side of said frame coaxial with said first axis, means fixing said inboard and outboard bearing means to said frame in pivotal engagement respectively with said inboard and outboard end portions of the corresponding hub structure, the central vertical longitudinally extending plane of said arm being closer to the central vertical longitudinally extending plane of one said bearing means than to the central vertical longitudinally extending plane of the other of said bearing means, and means resiliently supporting said frame on said arms including two resilient rubber bodies operatively interposed between each arm and frame structure, one of said resilient rubber bodies being a first stage rubber spring body located between each hub structure and the axis of the corresponding rubber tired wheel and serving to resiliently support said frame structure when empty, and the other of said resilient rubber bodies being a second stage rubber body interposed between said frame structure and said other end of said arm and fixed to one and being out of contact with the other when said frame is empty and serving to add its resilient support to the frame structure when the latter is loaded.

7. A vehicle spring suspension adapted to be interposed between a vehicle frame and a rubber tired supporting wheel having a road engaging tread, wherein the improvement comprises a tubular hub structure including a central body portion and two end portions projecting axially from opposite sides of said body portion, an arm fixed at one end to said body portion to project radially therefrom and having a chamber extending the full length thereof in communication with the interior of said body portion and forming a gear case, a stub axle projecting from the other end of said arm and journalled on said wheel, an inboard first bearing means and an outboard second bearing means fixed to said frame in pivotal engagement respectively with said inboard and outboard end portions of said hub structure, the longitudinal center of said arm being spaced a first distance from said first bearing means and being spaced a second distance from said second bearing means, said first and second distances differing from each other thereby to proportion the load against said arm between its first and second bearing means in accordance with said distances from the center of said arm, a drive axle in said gear case and tubular stub axle and operatively connected at one end to said rubber tired wheel and being splined at its other end, a large gear in said gear case journalled on said arm concentrically with said tubular stub axle and having a splined bore fitting said splined end of said drive axle, a train of intermeshing gears journalled in said gear case on said arm and one end with said large gear, an input gear concentrically in said tubular hub structure meshing with the other end of said train of gears, a drive shaft concentrically in said hub structure and connected to said input gear, and means resiliently supporting said frame on said arm including a resilient rubber body compressed by said arm to expand and contract laterally of such compression to provide resilient support for said frame on said rubber tired wheel.

8. A vehicle spring suspension as set forth in claim 7 wherein said second bearing means comprises adifferential gear housing into which said drive shaft extends, a tubular neck projecting from said differential gear housing and containing said drive shaft, a flexible rubber bushing embracing said tubular neck and sealed at its other end against the opening admitting said drive shaft to said gear housing, and a pair of half bearing housings forming the corresponding end of said hub structure and compressively embracing said flexible rubber bushing.

(References on following page)

References Cited

UNITED STATES PATENTS

| | | | |
|---|---|---|---|
| 1,833,053 | 11/1931 | McManus | 180—22 X |
| 2,139,547 | 12/1938 | Kales et al. | 280—104.5 |
| 2,255,365 | 9/1941 | Poche. | |
| 2,265,518 | 12/1941 | Coote et al. | 280—104.5 |
| 2,298,282 | 10/1942 | Brown. | |
| 2,361,496 | 10/1944 | Pointer. | |
| 3,140,880 | 7/1964 | Masser | 280—104.5 X |
| 3,175,637 | 3/1965 | Honda | 180—72 |
| 2,635,896 | 4/1953 | Tantlinger | 280—104.5 |
| 3,078,104 | 2/1963 | Chalmers | 267—15 X |
| 3,276,476 | 10/1966 | Jackson | 267—15 X |

FOREIGN PATENTS

| | | |
|---|---|---|
| 940,078 | 5/1948 | France. |
| 204,980 | 12/1956 | Australia. |

A. HARRY LEVY, Primary Examiner

U.S. Cl. X.R.

180—22; 267—15; 280—104.5, 124